United States Patent
Park et al.

(10) Patent No.: US 11,435,619 B2
(45) Date of Patent: Sep. 6, 2022

(54) BACKLIGHT UNIT AND DISPLAY DEVICE

(71) Applicant: LG DISPLAY CO., LTD., Seoul (KR)

(72) Inventors: MyungJoon Park, Gyeonggi-do (KR); Kyuhwan Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/381,997

(22) Filed: Jul. 21, 2021

(65) Prior Publication Data
US 2022/0066089 A1    Mar. 3, 2022

(30) Foreign Application Priority Data

Aug. 26, 2020 (KR) .......................... 10-2020-0108004

(51) Int. Cl.
*G02F 1/13357* (2006.01)
*F21V 8/00* (2006.01)

(52) U.S. Cl.
CPC ...... *G02F 1/133611* (2013.01); *G02B 6/0051* (2013.01); *G02B 6/0055* (2013.01); *G02B 6/0068* (2013.01); *G02F 1/133605* (2013.01); *G02F 1/133606* (2013.01); *G02B 6/0021* (2013.01)

(58) Field of Classification Search
CPC .. G02B 6/0021; G02B 6/0051; G02B 6/0055; G02B 6/0068; G02F 1/133605–133607; G02F 1/133611
See application file for complete search history.

(56) References Cited

U.S. PATENT DOCUMENTS

| | | | |
|---|---|---|---|
| 2011/0051412 A1* | 3/2011 | Jeong ................ | G02F 1/133611 362/235 |
| 2016/0076738 A1* | 3/2016 | Hsueh ............... | G02F 1/133606 362/97.1 |
| 2019/0227221 A1* | 7/2019 | Yasunaga ............ | G02B 6/0055 |

* cited by examiner

*Primary Examiner* — Keith G. Delahoussaye
(74) *Attorney, Agent, or Firm* — Polsinelli PC

(57) ABSTRACT

A backlight unit for a display device includes a light path control pattern disposed over a light source and including portions having different types of reflective characteristic and a reflective layer disposed on a substrate where the light source is mounted and including portions having different types of reflective characteristic, a light guide distance of a light emitted from the light source can be increased and a light uniformity can be maintained, so that as a light can be supplied to each area evenly while increasing a distance between the light sources and reducing the number of the light sources, an image quality of the backlight unit can be enhanced.

19 Claims, 13 Drawing Sheets

BACKLIGHT UNIT AND DISPLAY DEVICE

CROSS-REFERENCE TO RELATED APPLICATION

This application claims priority from Korean Patent Application No. 10-2020-0108004, filed on Aug. 26, 2020, which is hereby incorporated by reference in its entirety.

BACKGROUND

Field of the Disclosure

The present disclosure is related to a backlight unit and a display device.

Description of the Background

The growth of the information society leads to increased demand for display devices to display images and use of various types of display devices, such as liquid crystal display devices, organic light emitting display devices, etc.

The liquid crystal display devices can include a display panel in which a liquid crystal layer is disposed. The liquid crystal display devices can include a light source device such as a backlight unit supplying a light to the display panel.

The liquid crystal display devices, in a state that the light is supplied to the display panel by the backlight unit, by controlling the liquid crystal layer to adjust a luminance that each subpixel represents, can display an image.

As the liquid crystal display devices include the backlight unit, an entire thickness can be increased by the backlight unit. If reducing a thickness of the backlight unit for reducing a thickness of the liquid crystal display device, an optical gap between a light source included in the backlight unit and the display panel may not be secured sufficiently.

In a case that the optical gap is not secured sufficiently, an image quality that the backlight unit represents can be dropped. And in a case that increasing the number of the light sources including the backlight unit for improving the image quality of the backlight unit whose thickness is thin, a manufacturing cost of the backlight unit can be increased.

Thus, methods capable of improving the image quality that the backlight unit represents are required while reducing the thickness of the backlight unit without increasing the number of the light sources included in the backlight unit.

SUMMARY

Aspects of the present disclosure provide methods capable of increasing a path of a light emitted from a light source included in a backlight unit while maintaining a light uniformity of the backlight unit.

Aspects of the present disclosure provide methods capable of improving an image quality that the backlight unit represents while reducing the number of the light sources included in the backlight unit and increasing a distance between the light sources.

In an aspect, aspects of the present disclosure provide a backlight unit including a plurality of light sources disposed on a substrate, a plurality of first light path control patterns located over the plurality of light sources, corresponding to each of the plurality of light sources, and among a reflected light by the first light path control pattern, a ratio of specularly reflected light is smaller than a ratio of diffusely reflected light, a plurality of second light path control patterns located around each of the plurality of first light path control patterns, and among a reflected light by the second light path control pattern, a ratio of specularly reflected light is greater than a ratio of diffusely reflected light, a first reflective layer disposed on at least a part area of an area other than an area where the plurality of light sources are disposed on the substrate, and a second reflective layer disposed on a partial area on the first reflective layer.

In another aspect, aspects of the present disclosure provide a backlight unit including a plurality of light sources, a plurality of light path control patterns located over the plurality of light sources, and corresponding to each of the plurality of light sources, wherein each of the plurality of light path control patterns includes, a first part disposed on an area including an area overlapping the light source, and among a reflected light by the first part, a ratio of specularly reflected light is smaller than a ratio of diffusely reflected light, and a second part disposed around the first part, and among a reflected light by the second part, a ratio of specularly reflected light is greater than a ratio of diffusely reflected light.

In another aspect, aspects of the present disclosure provide a backlight unit including a plurality of light sources disposed on a substrate, a plurality of light path control patterns located over the plurality of light sources, and corresponding to each of the plurality of light sources, a first reflective layer disposed on at least a part area of an area other than an area where the plurality of light sources are disposed on the substrate, and including a plurality of first holes corresponding to each of the plurality of light sources, and a second reflective layer disposed on a partial area on the first reflective layer, including a plurality of second holes corresponding to each of the plurality of light sources, and a size of each of the plurality of second holes is greater than a size of each of the plurality of first holes.

In another aspect, aspects of the present disclosure provide a display device including above-mentioned backlight unit and a display panel located on the backlight and supplied with a light from the backlight unit.

According to various aspects of the present disclosure, as disposing a light path control pattern including a central portion that a ratio of diffusely reflection is high and an outer portion that a ratio of specularly reflection is high over a light source, an amount of a light totally reflected by the outer portion of the light path control pattern can be increased to increase a path of a light emitted from the light source.

According to various aspects of the present disclosure, as the light emitted from the light source is reflected by a reflective layer that a ratio of specularly reflection is high on an area adjacent to the light source and is reflected by a reflective layer that a ratio of diffusely reflection is high on an area between the light sources, the path of the light emitted from the light source can be increased while maintaining a light uniformity.

Thus, an image quality that a backlight unit represents can be improved while minimizing the number of the light sources included in the backlight unit.

BRIEF DESCRIPTION OF THE DRAWINGS

The above and other features, and advantages of the present disclosure will be more clearly understood from the following detailed description, taken in conjunction with the accompanying drawings, in which.

DETAILED DESCRIPTION

Figure 1:
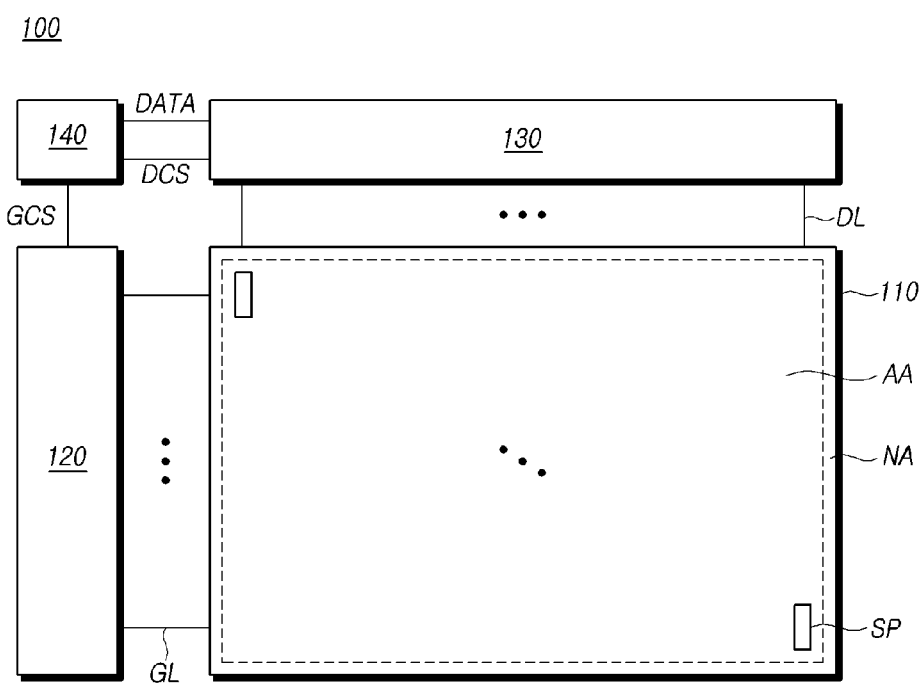
FIG. 1 is a diagram schematically illustrating a configuration of a display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 is a diagram schematically illustrating a configuration included in a display device 100 according to aspects of the present disclosure. All the components of the display device 100 according to all aspects of the present disclosure are operatively coupled and configured.

Referring to FIG. 1, the display device 100 can include a display panel 110, and a gate driving circuit 120, a data driving circuit 130 and a controller 140 for driving the display panel 110.

The display panel 110 can include an active area AA where a plurality of subpixels SP is disposed, and a non-active area which is located outside the active area AA.

A plurality of gate lines GL and a plurality of data lines DL can be arranged on the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides of the display panel 110 according to a driving method.

Each gate driver integrated circuit GDIC can be connected to a bonding pad of the display panel 110 by a tape automated bonding TAB method or a chip-on-glass COG method, or can be implemented by a gate-in-panel GIP method to then be directly arranged on the display panel 110. In some cases, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method, or can be directly disposed on the display panel 110. Alternatively, in some cases, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

On each of the plurality of subpixels SP, according to types of the display device 100, a liquid crystal layer can be disposed, or a light-emitting element can be disposed. In the case of a liquid crystal display device that the liquid crystal layer is disposed on the subpixel SP, the display device 100 can include a backlight unit supplying a light to the display panel 110.

Figure 2:
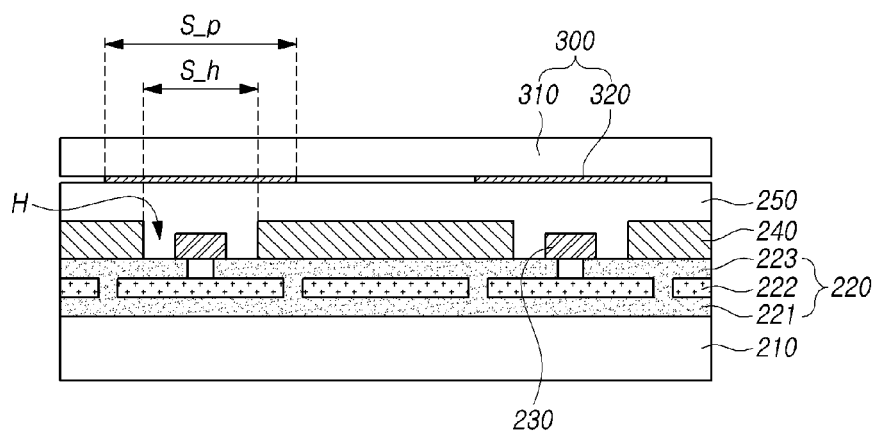
FIG. 2 is a diagram illustrating an example of a structure of a backlight unit according to aspects of the present disclosure.

FIG. 2 is a diagram illustrating an example of a structure of a backlight unit according to aspects of the present disclosure.

Referring to FIG. 2, the backlight unit can include a cover bottom 210 accommodating various members.

A substrate 220 can be disposed on the cover bottom 210, and a plurality of light sources 230 can be mounted on the substrate 220. The substrate 220, for example, can be attached by an adhesive tape, but not limited to this.

The substrate 220, for example, can be a printed circuit board, or a flexible printed circuit. Alternatively, the substrate 220 can mean what an electrode for forming a line is patterned on a transparent glass or a polyimide.

The substrate 220, for example, can include a first line layer 221 and a second line layer 223. The substrate 220 can include a line insulating layer 222 disposed between the first line layer 221 and the second line layer 223.

The first line layer 221 and the second line layer 223 can be electrically connected to each other through a contact-hole made in the line insulating layer 222.

A voltage for driving of the light source 230 can be supplied through the first line layer 221. The second line layer 223 can be electrically connected to an electrode of the light source 230, and can transfer a signal for driving of the light source 230 to the light source 230.

The light source 230 can be mounted on the substrate 220, and can emit a light of a specific wavelength band (e.g., white light, blue light or the like). The light source 230 can be a light-emitting diode LED, or can be a mini light-emitting diode Mini LED having a size of hundreds of μm, or can be a micro light-emitting diode μ LED having a size of tens of μm.

A reflective layer 240 can be disposed on at least a part area of an area where the light source 230 is not disposed on the substrate 220.

The reflective layer 240 can include a plurality of holes H. Each of the plurality of holes H included in the reflective layer 240 can be corresponded to each of the plurality of light sources 230. For example, each of the plurality of light sources 230 can be located inside each of the plurality of holes H included in the reflective layer 240.

In a case that a size of the light source 230 is small, a top end of the reflective layer 240 can be located higher than a top end of the light source 230.

The reflective layer 240 can reflect a light emitted from the light source 230 to an upper portion of the backlight unit to increase a light supplied to the display panel 110. Furthermore, as the reflective layer 240 reflects a light on an area between the light source 230 and the light source 230, a light uniformity between an area adjacent to the light source 230 and an area apart from the light source 230 can be enhanced.

A light source protective portion 250 can be disposed on the light source 230 and the reflective layer 240.

The light source protective portion 250 can provide functions of protecting the light source 230 and guiding a light emitted from the light source 230.

The light source protective portion 250, for example, can be made of a resin. In a state that the light source 230 and the reflective layer 240 are disposed on the substrate 220, the light source protective portion 250 can be disposed by a process molding the resin.

The light source protective portion 250, in some cases, can be disposed only inside the hole H of the reflective layer 240. In this case, a transparent film or the like for guiding a light can be disposed on the light source protective portion 250 and the reflective layer 240.

Various optical members can be disposed on the light source protective portion 250 for controlling a path of a light emitted from the light source 230, diffusing a light, or converting a wavelength of a light.

For example, a light path control film 300 can be disposed on the light source protective portion 250. Furthermore, although not illustrated in FIG. 2, various optical sheet such as a diffusion sheet, a color conversion sheet or the like can be disposed on the light path control film 300.

The light path control film 300 can include a base film 310 which is transparent or has a high transparency. The base film 310, for example, can be made of PET or PC, but not limited to this.

The light path control film 300 can include a plurality of light path control patterns 320 disposed on at least one surface of a top surface and a bottom surface of the base film 310.

Each of the plurality of light path control patterns 320 can be located to be corresponded to each of the plurality of light sources 230.

Although FIG. 2 illustrates the example that the light path control pattern 320 is disposed on the bottom surface of the base film 310, but the light path control pattern 320 can be disposed on the top surface of the base film 310.

In the case that the light path control pattern 320 is disposed on the bottom surface of the base film 310, the light path control pattern 320 can be disposed to be directly contact with a top surface of the light source protective portion 250.

Alternatively, an adhesive layer can be disposed between the light path control film 300 and the light source protective portion 250.

In this case, the light path control pattern 320 can be contact with the adhesive layer. Alternatively, an air layer can be present between the light path control pattern 320 and the light source protective portion 250.

The light path control pattern 320, for example, can be made by printing a material having a high reflectivity such as TiO2 on the base film 310.

The light path control pattern 320 can be made as a single layer, or can be made as a plurality of layers. In the case that the light path control pattern 320 is made as a plurality of layers, a thickness of a central portion of the light path control pattern 320 can be greater than a thickness of an outer portion of the light path control pattern 320.

A size (area or width) S_p of the light path control pattern 320 can be equal to or greater than a size (area or width) S_h of the hole H of the reflective layer 240 where the light source 230 is disposed.

Alternatively, in some cases, the size S_p of the light path control pattern 320 can be smaller than the size S_h of the hole H.

The light path control pattern 320 having a reflective characteristic can be disposed over the light source 230, and can change a path of a light on an area where an intensity of a light emitted from the light source 230 is the strongest, and can make the light spread evenly.

And the size of the light path control pattern 320 can be determined considering the size of the light source 230, the size of the hole H of the reflective layer 240, or a distance between the light sources 230, or the like.

Figure 3:
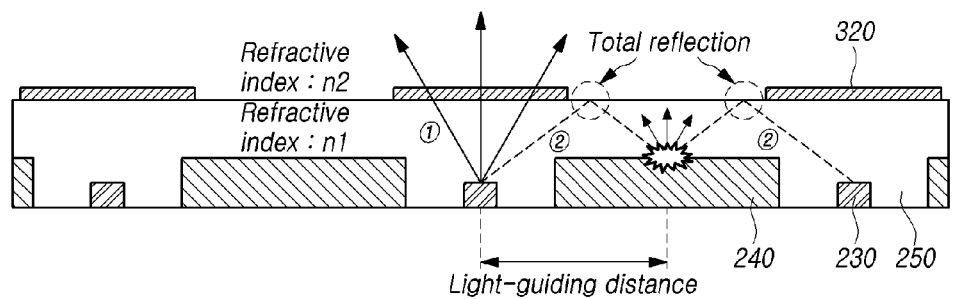
FIG. 3 is a diagram illustrating an example of a path of a light emitted from a light source included in the backlight unit illustrated in FIG. 2.

FIG. 3 is a diagram illustrating an example of a path of a light emitted from the light source 230 included in the backlight unit illustrated in FIG. 2.

Referring to FIG. 3, some of the light emitted from the light source 230 can be transmitted the light path control pattern 320 such as ①. Furthermore, some of the light emitted from the light source 230 can be reflected by the light path control pattern 320. A light reflected by the light path control pattern 320 can be reflected by the reflective layer 240 again to supply to an upper portion.

As the light path control pattern 320 transmits some of the light emitted from the light source 230 and reflects other some of the light, a light uniformity of an area adjacent to the light source 230 and an area apart from the light source 230 can be enhanced.

A light which is not reached to the light path control pattern 320 among the light emitted from the light source 230 can be output to outside through the light source protective portion 250.

Furthermore, some of a light reached to an outside area of the light path control pattern 320 can be totally reflected on a top surface of the light source protective portion 250 such as ②.

For example, a refractive index n1 of the light source protective portion 250 can be greater than a refractive index n2 of an air layer or other members located on the light source protective portion 250. And when a light reached to the top surface of the light source protective portion 250 is reached as an incidence angle larger than a critical angle that a total reflection is performed, a light can be totally reflected on the top surface of the light source protective portion 250.

A light totally reflected on the top surface of the light source protective portion 250 can be guided inside the light source protective portion 250 and can be reflected by the reflective layer 240.

Thus, the light emitted from the light source 230 can be spread evenly by a light path conversion by the light path control pattern 320 and the total reflection on a peripheral area of the light path control pattern 320.

Here, in a case that a flatness of the top surface of the light source protective portion 250 is high, the total reflection of a light can be performed easily on the top surface of the light source protective portion 250.

In a case that the flatness of the top surface of the light source protective portion 250 is low by a material making the light source protective portion 250 or a characteristic of a process, that is, if the top surface of the light source protective portion 250 has an uneven shape, a light can be output to outside not totally reflected on the top surface of the light source protective portion 250. In this case, an amount of a light guided inside the light source protective portion 250 can be reduced and uniformity of a light can be dropped.

And in a case that the light path control pattern 320 is disposed to be extended, as the light path control pattern 320 has a high characteristic to reflect a light diffusely, the total reflection of a light may not be performed.

Aspects of the present disclosure, by the light path control pattern 320 having a different reflective characteristic according to portions, can make functions of diffusing, light-guiding of the light emitted from the light source 230 be enhanced.

Figure 4A:
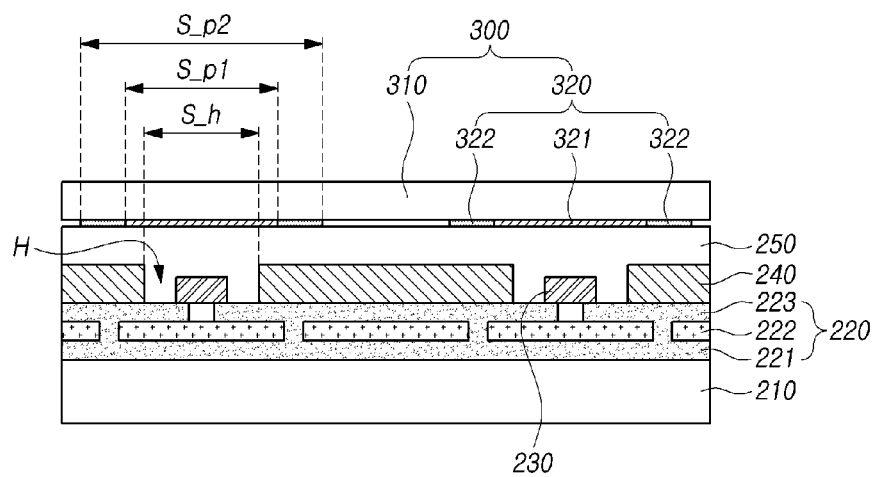
FIGS. 4A and 4B are diagrams illustrating another example of a structure of a backlight unit according to aspects of the present disclosure.
Figure 4B:
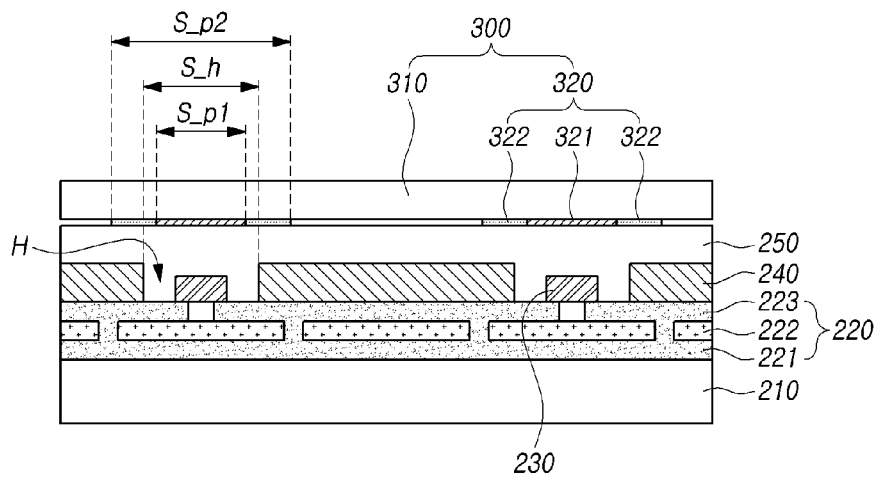

FIGS. 4A and 4B are diagrams illustrating another example of a structure of a backlight unit according to aspects of the present disclosure.

Referring to FIGS. 4A and 4B, the light source protective portion 250 can be disposed on the light source 230 and the reflective layer 240. The light path control film 300 can be disposed on the light source protective portion 250.

The light path control film 300 can include the base film 310 and a plurality of light path control patterns 320 disposed on at least one surface of both surfaces of the base film 310.

Each of the plurality of light path control pattern 320 can include a first light path control pattern 321 located on a central portion and a second light path control pattern 322 located on an outer portion. The first light path control pattern 321 can be seen as a first part of the light path control pattern 320, and the second light path control pattern 322 can be seen as a second part of the light path control pattern 320.

The first light path control pattern 321 can be disposed on or over the light source 230, and can be disposed on an area including an area overlapping the light source 230.

The first light path control pattern 321, such as described above, can be made of a material such as TiO2 having a reflective characteristic that a ratio of diffusely reflection is higher than a ratio of specularly reflection. Thus, when the light emitted from the light source 230 is reached to the first light path control pattern 321, some of the light can be transmitted, and other some of the light can be scattered, diffracted, reflected.

The second light path control pattern 322 can be disposed around the first light path control pattern 321.

The second light path control pattern 322 can be made of a metal. For example, the second light path control pattern 322 can be made of Mo, Al, Cu, Ag or alloy of thereof.

The second light path control pattern 322 can have a reflective characteristic different from a reflective characteristic of the first light path control pattern 321.

For example, a ratio of specularly reflection of the second light path control pattern 322 can be greater than a ratio of specularly reflection of the first light path control pattern 321. And a ratio of diffusely reflection of the second light path control pattern 322 can be smaller than a ratio of diffusely reflection of the first light path control pattern 321.

Furthermore, a ratio of specularly reflection of the second light path control pattern 322 can be greater than a ratio of diffusely reflection of the second light path control pattern 322. For example, among a light that a light reached to the second light path control pattern 322 is reflected, a ratio of specularly reflected light is greater than a ratio of diffusely reflected light.

As the second light path control pattern 322 is disposed around the first light path control pattern 321, a light reached to a peripheral area of the first light path control pattern 321 can be reflected by the second light path control pattern 322.

Almost all of a light reflected by the second light path control pattern 322 can be specularly reflected. Thus, a light reached to the second light path control pattern 322 can be reflected as a path same or similar with a path of a light totally reflected. A light-guiding distance of the light emitted from the light source 230 can be increased by the second light path control pattern 322.

As diffusing, and diffusely reflecting a light by the first light path control pattern 321 located on the light source 230, and totally reflecting a light by the second light path control pattern 322 disposed on a peripheral area of the first light path control pattern 321 to increase the light-guiding distance, the light emitted from the light source 230 can be spread evenly. Furthermore, according to increasing the light-guiding distance of a light, a distance between the light sources 230 can be increased.

A size of the light path control pattern 320 including the first light path control pattern 321 and the second light path control pattern 322 can be greater than a size of the hole H included in the reflective layer 240, but can be various according to the size of the hole H or a distance between the light source 230 and the light path control pattern 320.

Referring to FIG. 4A, a size (area or width) S_p2 of the second light path control pattern 322 according to an outer boundary of the second light path control pattern 322 can be greater than a size (area or width) S_h of the hole H.

Furthermore, a size (area or width) S_p1 of the first light path control pattern 321 according to an outer edge of the first light path control pattern 321 can be also greater than the size (area or width) S_h of the hole H.

A light-guiding by the total reflection can be performed on a peripheral of the first light path control pattern 321 by disposing the second light path control pattern 322 on outside area of the first light path control pattern 321 additionally while maintaining a size of an area where the light emitted from the light source 230 is diffused by the first light path control pattern 321.

Alternatively, referring to FIG. 4B, the size S_p2 of the second light path control pattern 322 can be greater than the size S_h of hole H.

And the size S_p1 of the first light path control pattern 321 can be smaller than the size S_h of the hole H.

In some cases, in a state that the first light path control pattern 321 is smaller than the hole H, the second light path control pattern 322 can be disposed on a peripheral of the first light path control pattern 321 to make the light-guiding by the total reflection.

Furthermore, at least a portion of the second light path control pattern 322 can be located on an area where an incidence angle of the light emitted from the light source 230 is smaller than a critical angle that a light is totally reflected.

As the second light path control pattern 322 is disposed on an area where the total reflection is not performed on a peripheral of the first light path control pattern 321 because the incidence angle of a light is smaller than the critical angle, an amount of a light totally reflected on the top surface of the light source protective portion 250 can be increased.

Figure 5:
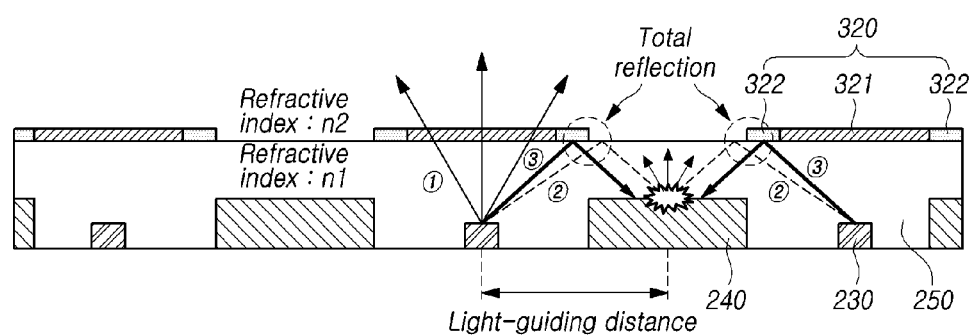
FIG. 5 is a diagram illustrating an example of a path of a light emitted from a light source included in the backlight unit illustrated in FIG. 4A or 4B.

FIG. 5 is a diagram illustrating an example of a path of the light emitted from the light source 230 included in the backlight unit illustrated in FIG. 4A or 4B.

Referring to FIG. 5, among the light emitted from the light source 230, some of a light reached to the first light path control pattern 321 can be transmitted the first light path control pattern 321 and can be output to outside such as ①. Furthermore, other some of the light reached to the first light path control pattern 321 can be scattered, diffracted, reflected by the first light path control pattern 321.

Some of the light emitted from the light source 230 can be reached on an outside area of the light path control pattern 320 such as ②.

The light reached to the outside area of the light path control pattern 320 can be incident as an incidence angle larger than the critical angle of the total reflection. Thus, the light reached to the outside area of the light path control pattern 320 can be totally reflected on the top surface of the light source protective portion 250 and can be guided inside the light source protective portion 250.

Some of the light emitted from the light source 230 can be reached to the second light path control pattern 322 at an angle larger than the critical angle of the total reflection such as ③.

The second light path control pattern 322 can have a reflective characteristic that a ratio of specularly reflection is greater than a ratio of diffusely reflection. The light reached to the second light path control pattern 322 can be reflected as a path same or similar with a light totally reflected.

Thus, it can be increased that an area where the light is totally reflected on the outside area of the first light path control pattern 321.

A light totally reflected on the outside area of the first light path control pattern 321 can be guided inside the light source protective portion 250, reflected by the reflective layer 240, and supplied to the upper portion of the backlight unit.

As a distance light-guided inside the light source protective portion 250 is increased, a distance between the light sources 230 can be increased to reduce the number of the light sources 230.

Furthermore, as the light emitted from the light source 230 is spread evenly, a light uniformity can be maintained or enhanced on an area adjacent to the light source 230 and an area between the light source 230 and the light source 230

The second light path control pattern 322 disposed around the first light path control pattern 321 can be disposed as a similar shape with the first light path control pattern 321.

Alternatively, the second light path control pattern 322 can be disposed as a different shape with the first light path control pattern 321.

Figure 6A:
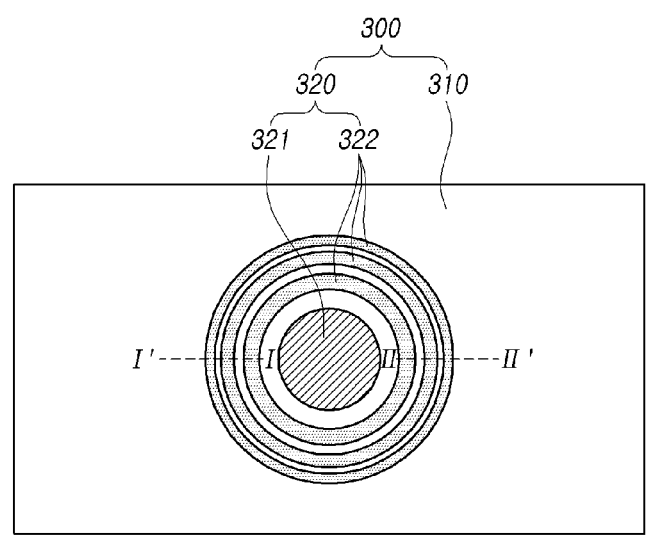
FIGS. 6A and 6B are diagrams illustrating another example of a structure of a light path control pattern illustrated in FIGS. 4A and 4B.
Figure 6A:
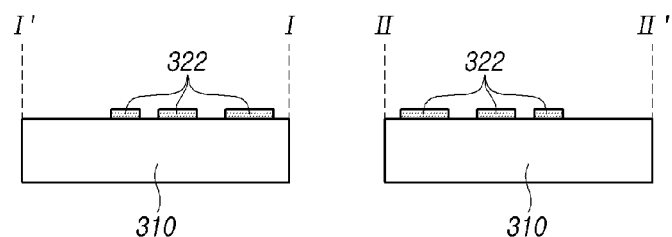
Figure 6B:
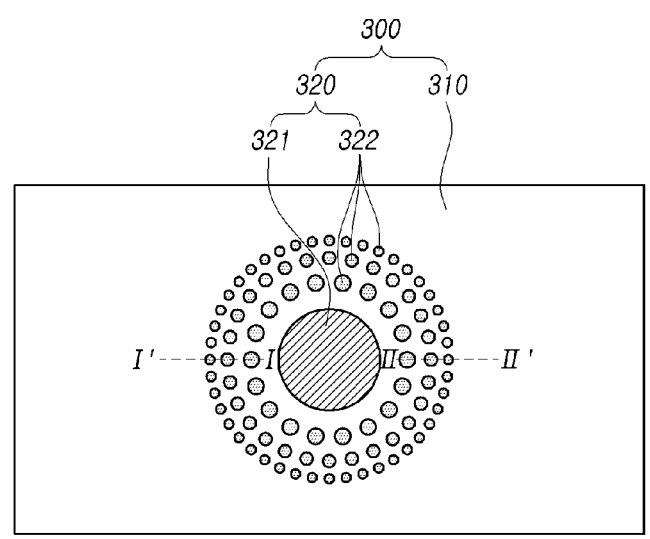
Figure 6B:
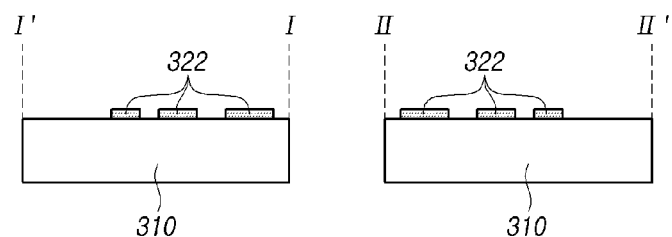

FIGS. 6A and 6B are diagrams illustrating another example of a structure of the light path control pattern 320 illustrated in FIGS. 4A and 4B.

Referring to FIG. 6A, it illustrates an example that the first light path control pattern 321 and the second light path control pattern 322 are disposed on the top surface of the base film 310. And it illustrates an example of a cross-sectional structure of a portion I-I' and a portion II-II' in a plan view of the light path control film 300 illustrated in FIG. 6A.

The first light path control pattern 321 can have a reflective characteristic that a ratio of diffusely reflection is greater than a ratio of specularly reflection.

The first light path control pattern 321 have to convert a path of a light on an area overlapping the light source 230 where an intensity of the light emitted from the light source 230 is the strongest. Thus, an empty space may not be present inside the first light path control pattern 321.

The second light path control pattern 322 can be disposed on a peripheral of the first light path control pattern 321.

The second light path control pattern 322 can have a reflective characteristic that a ratio of specularly reflection is greater than a ratio of diffusely reflection.

As the second light path control pattern 322 specularly reflects almost all of the light emitted from the light source 230, a light reached to the second light path control pattern 322 can be light-guided same or similar with a path of a light totally reflected.

An empty space can be present inside the second light path control pattern 322.

The second light path control pattern 322 is for increasing or adjusting an amount of a light totally reflected on an area where a light is transmitted or totally reflected, an empty space can be present inside the second light path control pattern 322.

Some of a light reached to an area where the second light path control pattern 322 is disposed can be reflected by the second light path control pattern 322, and/or can be transmitted the empty space being present inside the second light path control pattern 322 to be output to outside.

The second light path control pattern 322 can be disposed greater on an area adjacent to the first light path control pattern 322 where an amount of a light reached is large or an incidence angle of the light reached is small. The second light path control pattern 322 can be disposed smaller on an area where an amount of a light reached is small or an incidence angel of the reached light is great.

A size and a position of the empty space being present inside the second light path control pattern 322 can be designed variously considering an image quality represented on an area where the light path control pattern 320 is disposed and on a peripheral area of the light path control pattern 320.

Referring to FIG. 6B, it illustrates another example that the first light path control pattern 321 and the second light path control pattern 322 are disposed on the top surface of the base film 310.

The first light path control pattern 321 can be disposed to be corresponded to an area overlapping the light source 230 on the base film 310. The second light path control pattern 322 can be disposed as a dot shape around the first light path control pattern 321.

As the second light path control pattern 322 is disposed as the dot shape, an empty space can be present between an outer boundary of the second light path control pattern 322 and an inner boundary of the second light path control pattern 322. And the second light path control pattern 322 can be disposed greater on an area adjacent to the first light path control pattern 321, and can be disposed smaller on an area far from the first light path control pattern 321.

Besides examples described above, the second light path control pattern 322 disposed on a peripheral of the first light path control pattern 321 can be disposed as various shapes.

While disposing the second light path control pattern 322 having a reflective characteristic different from the first light path control pattern 321 on a peripheral of the first light path control pattern 321 to increase a distance that a light moves inside the light source protective portion 250, an image quality of the backlight unit can be improved by adjusting a transmittance of a light on an area where the second light path control pattern 322 is disposed by an arrangement shape of the second light path control pattern 322.

Furthermore, as aspects of the present disclosure can configure the reflective layer 240 as a plurality of layers and make reflective characteristics of the plurality of layers be different, a function of light-guiding inside the light source protective portion 250 can be enhanced more, thus an image quality of the backlight unit can be improved while reducing the number of the light sources 230.

Figure 7:
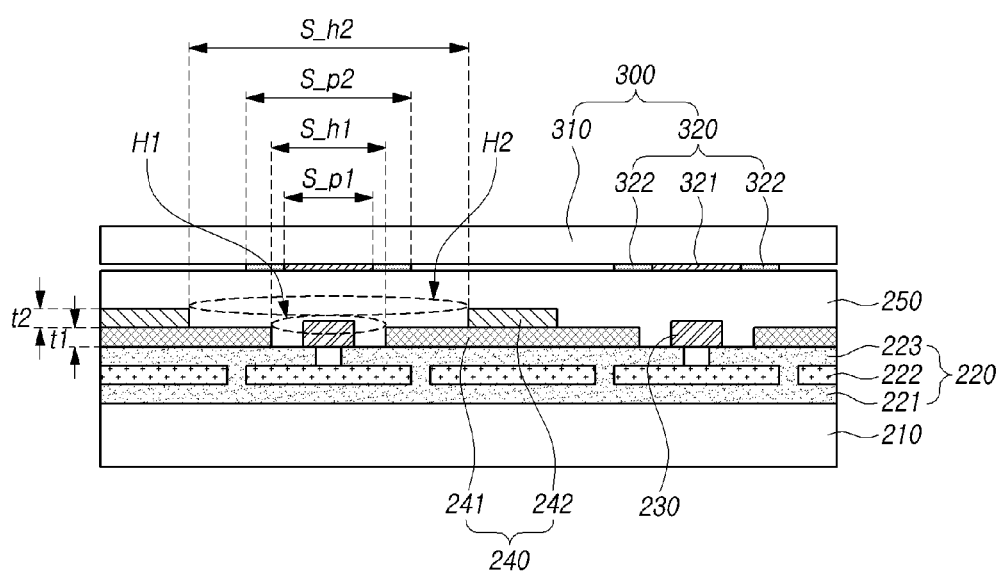
FIG. 7 is a diagram illustrating another example of a structure of a backlight unit according to aspects of the present disclosure.

FIG. 7 is a diagram illustrating another example of a structure of a backlight unit according to aspects of the present disclosure.

Referring to FIG. 7, the backlight unit can include the plurality of light sources 230 disposed on the substrate 220.

The reflective layer 240 can be disposed on at least a part area of an area where the light source 230 is not disposed on the substrate 220.

The reflective layer 240 can include a first reflective layer 241, and a second reflective layer 242 disposed on the first reflective layer 241.

The first reflective layer 241 can be disposed on an area where the light source 230 is not disposed on the substrate 220, and a portion of the first reflective layer 241 can overlap a portion of the light path control pattern 320 located on or over the light source 230. The first reflective layer 241 can overlap the first light path control pattern 321 and the second light path control pattern 322, in some cases, may not overlap the first light path control pattern 321 and can overlap only the second light path control pattern 322.

The second reflective layer 242 can be disposed on a partial area on the first reflective layer 241. The second reflective layer 242 can be located inside than a boundary of the first reflective layer 241. For example, the second reflective layer 242 is disposed on the first reflective layer 241, but at least a portion of the first reflective layer 241 can be exposed.

Furthermore, the example illustrated in FIG. 7 illustrates a case that the second reflective layer 242 is disposed on the first reflective layer 241, but the first reflective layer 241 may not be located on an area where the second reflective layer 242 is disposed.

A reflective characteristic of the first reflective layer 241 and a reflective characteristic of the second reflective layer 242 can be different from each other.

A ratio of specularly reflected light among a reflected light by the first reflective layer 241 can be different from a ratio of specularly reflected light among a reflected light by the second reflective layer 242. For example, a ratio of specularly reflection of the first reflective layer 241 can be greater than a ratio of specularly reflection of the second reflective layer 242.

The first reflective layer 241 can have a reflective characteristic similar with the second light path control pattern 322 described above as an example.

The second reflective layer 242 can have a characteristic that diffusely reflects a light reflected by the light path control pattern 320 and light-guided inside the light source protective portion 250 such as the reflective layer 240 described in an above-mentioned example.

For example, among a reflected light by the first reflective layer 241, a ratio of specularly reflected light can be greater than a ratio of diffusely reflected light. And among a reflected light by the second reflective layer 242, a ratio of specularly reflected light can be smaller than a ratio of diffusely reflected light.

As the first reflective layer 241 has a reflective characteristic that a ratio of specularly reflection is high, a light reflected by the second light path control pattern 322 or reflected on an outside area of the light path control pattern 320 can be reflected on the first reflective layer 241, and a movement distance of the light can be increased inside the light source protective portion 250.

And when a light light-guided inside the light source protective portion 250 is reached to the second reflective layer 242, and the light can be diffusely reflected and supplied to the upper portion of the backlight unit.

Thus, according to aspects of the present disclosure, increasing a light-guiding distance of the light emitted from the light source 230, reducing the number of the light sources 230 included in the backlight unit, and the backlight unit can be provided that a light is supplied evenly for each area.

The first reflective layer 241, for example, can be disposed by depositing a metal material on the substrate 220. In this case, a thickness t1 of the first reflective layer 241 can be smaller than a thickness t2 of the second reflective layer 242. And a top surface of the first reflective layer 241 can be positioned lower than a top end of the light source 230, and a top surface of the second reflective layer 242 can be positioned higher than the top end of the light source 230.

The first reflective layer 241, for another example, can be disposed as a film type. In this case, the thickness t1 of the first reflective layer 241 can be similar with the thickness t2 of the second reflective layer 242, in some cases, the thickness t1 can be greater than the thickness t2.

The second reflective layer 242 can be disposed on a partial area on the first reflective layer 241. The second reflective layer 242, in some cases, can be a structure including the hole H similarly with the first reflective layer 241.

For example, the first reflective layer 241 can include a plurality of first holes H1 located on an area corresponding to the light source 230.

Furthermore, the second reflective layer 242 can include a plurality of second holes H2 located on an area corresponding to each of the plurality of first holes H1 and being greater than the first hole H1.

A size S_h1 of the first hole H1 can be smaller than a size of the light path control pattern 320, that is, a size S_p2 defined according to the outer boundary of the second light path control pattern 322.

And the size S_h1 of the first hole H1 can be greater than a size S_p1 of the first light path control pattern 321. The first reflective layer 241 can only overlap the second light path control pattern 322.

Alternatively, the size S_h1 of the first hole H1 is smaller than the size S_p1 of the first light path control pattern 321, an area where the first reflective layer 241 and the first light path control pattern 321 are overlapped can be present.

A size S_h2 of the second hole H2 can be greater than the size S_p2 of the second light path control pattern 322.

Since the second reflective layer 242 is disposed to diffusely reflect a light reflected, light-guided by the second light path control pattern 322 and the first reflective layer 241, can be disposed on an area between the light source 230 and the light source 230, and may not overlap the light path control pattern 320.

Thus, by a structure that the second light path control pattern 322 disposed around the first light path control pattern 321 overlaps the first reflective layer 241 and does not overlap the second reflective layer 242, a light can be supplied evenly for each area while increasing the light-guiding distance inside the light source protective portion 250.

Figure 8:
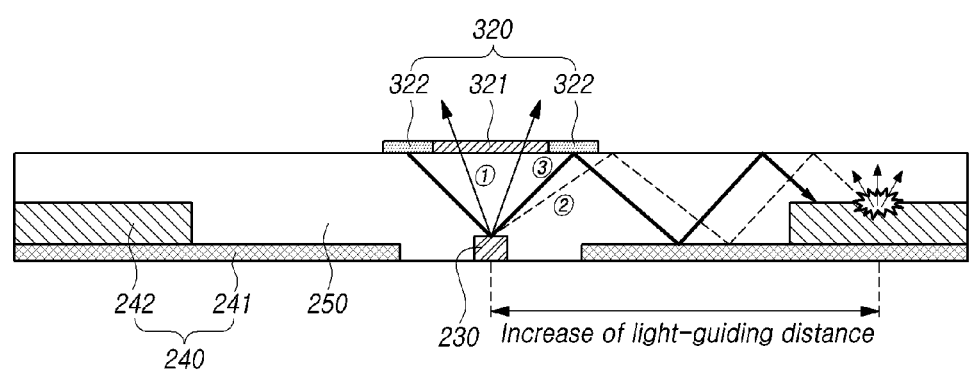
FIG. 8 is a diagram illustrating an example of a path of a light emitted from a light source included in the backlight unit illustrated in FIG. 7.

FIG. 8 is a diagram illustrating an example of a path of the light emitted from the light source 230 included in the backlight unit illustrated in FIG. 7.

Referring to FIG. 8, a light reached to the first light path control pattern 321 such as ① among the light emitted from the light source 230 can be transmitted the first light path control pattern 321, or can be scattered, diffracted, reflected by the first light path control pattern 321.

A light being incident as an incidence angle greater than the critical angle of the total reflection such as ② among the light emitted from the light source 230 can be totally reflected on the top surface of the light source protective portion 250.

A light reached to the second light path control pattern 322 at an angle larger than the critical angle of the total reflection such as ③ among the light emitted from the light source 230 can be reflected same or similar with a totally reflected light, since a ratio of specularly reflection of the second light path control pattern 322 is high.

A light reflected on the top surface of the light source protective portion 250 such as ②, ③ can be reflected by the first reflective layer 241 located under the light source protective portion 250.

And as a light reflected by the first reflective layer 241 maintains an angle of the total reflection, can be light-guided inside the light source protective portion 250 until reaching the second reflective layer 242. A light reached to the second reflective layer 242 can be diffusely reflected by the second reflective layer 242 and can be output to the upper portion of the backlight unit.

Thus, by disposing the second light path control pattern 322 having a reflective characteristic different from the first light path control pattern 321 and the first reflective layer 241 having a reflective characteristic different from the second reflective layer 242, a movement distance of the light can be increased inside the light source protective portion 250. As the movement distance of the light is increased, a distance between the light sources 230 can be increased, an image quality represented by the backlight unit can be maintained or enhanced while reducing the number of the light sources 230 included in the backlight unit.

The first reflective layer 241 and the second reflective layer 242, such as an example described above, can be disposed as structure including the hole H similarly each other, the first reflective layer 241 or the second reflective layer 242 can be disposed as various types according to a manufacturing process or the like.

Figure 9A:
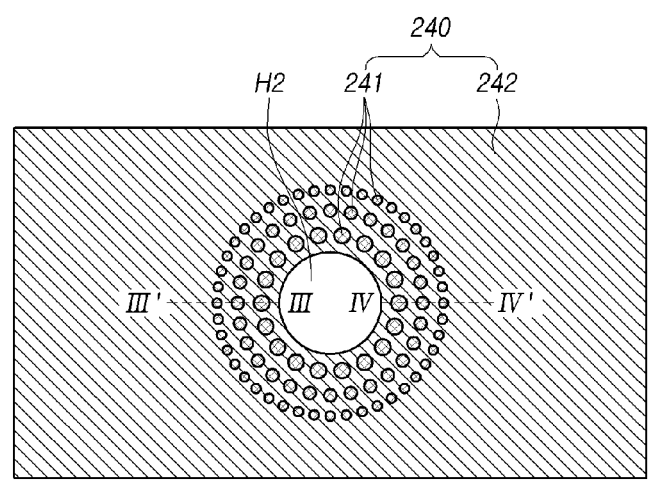
FIGS. 9A and 9B are diagrams illustrating another example of a structure of a reflective layer illustrated in FIG. 7.
Figure 9A:
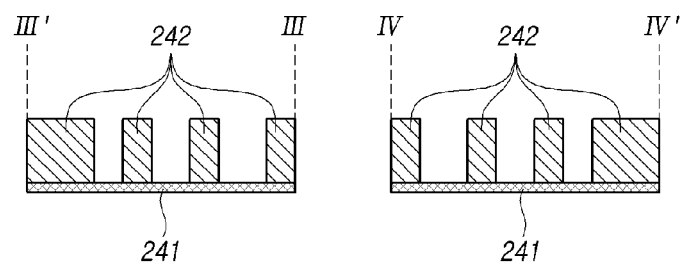
Figure 9B:
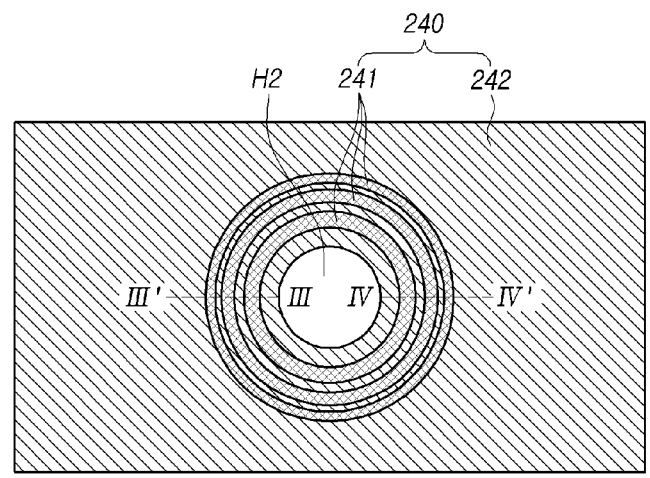
Figure 9B:
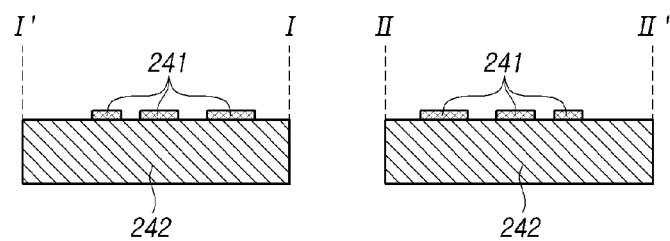

FIGS. 9A and 9B are diagrams illustrating another example of a structure of the reflective layer 240 illustrated in FIG. 7.

Referring to FIG. 9A, it illustrates an example of a plane structure of the reflective layer 240 that the second reflective layer 242 is disposed on the first reflective layer 241 and an example of a cross-sectional structure of a portion and a portion IV-IV' in a plan view.

The second reflective layer 242 can be disposed on the first reflective layer 241. And the second reflective layer 242 can be removed as a certain pattern on an area adjacent to a second hole H2 located on an area corresponding to the light source 230. For example, a portion of the second reflective layer 242 can be removed by a method punching in a state that the first reflective layer 241 and the second reflective layer 242 are stacked.

As the first reflective layer 241 is exposed on an area where the second reflective layer 242 is removed, a light reflected on the second light path control pattern 322 can be light-guided by the first reflective layer 241.

Alternatively, in some cases, the first reflective layer 241 having a reflective characteristic that a ratio of specularly reflection is high can be disposed on the second reflective layer 242.

Referring to FIG. 9B, the first reflective layer 241 can be disposed on an area adjacent to the second hole H2 on the second reflective layer 242. The first reflective layer 241, such as an example illustrated in FIG. 9B, can be disposed as a circle shape. Alternatively, such as an example described above, can be disposed as a dot shape.

As disposing the first reflective layer 241 on a part area where a disposition of the first reflective layer 241 is required on the second reflective layer 242, an area where a ratio of specularly reflection is high can be implemented on the second reflective layer 242. Also, by making an empty space inside an area where the first reflective layer 241 is disposed to occur a diffusely reflection by the second reflective layer 242 according to a distribution or a characteristic of the light emitted through the backlight unit, an optical characteristic can be adjusted on an area adjacent to the light source 230.

Figure 10:
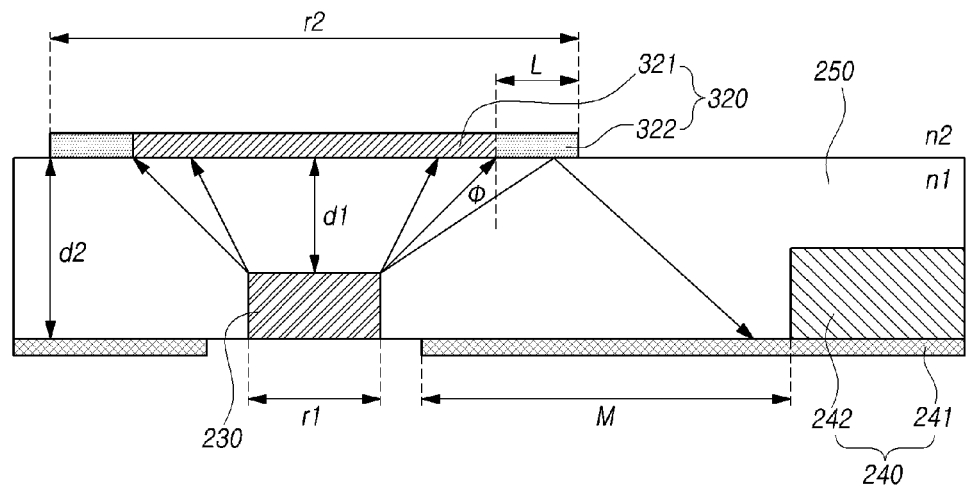
FIG. 10 is a diagram illustrating an example of a positional relation of a light path control pattern and a reflective layer in a structure of the backlight unit illustrated in FIG. 7.

FIG. 10 is a diagram illustrating an example of a positional relation of the light path control pattern 320 and the reflective layer 240 in a structure of the backlight unit illustrated in FIG. 7.

Referring to FIG. 10, a refractive index of the light source protective portion 250 can be n1, and a refractive index of an air layer or other optical members located outside the light source protective portion 250 can be n2. And n1 can be greater than n2.

A straight distance between the light source 230 and the light path control pattern 320 is referred to as d1, and a straight distance between the first reflective layer 241 and the light path control pattern 320 is referred to as d2.

A length of the light source 230 is referred to r1, and an entire length of the light path control pattern 320 is referred to r2.

Here, a length L of the second light path control pattern 322 among the light path control pattern 320 can be determined by the critical angle $\Phi$ that a light is totally reflected on the top surface of the light source protective portion 250.

The critical angle can be calculated as $\Phi = \sin(n2)/\sin(n1)$ by Snell's law.

In the case that the second light path control pattern 322 is disposed outside of a point making the critical angle of the total reflection, the length L of the second light path control pattern 322 can be calculated by $r2/2 - (r1/2 + d1 \times \tan \Phi)$.

The second light path control pattern 322 can be located on the point making the critical angle of the total reflection or can be disposed inside of the point making the critical angle of the total reflection. In this case, the length L of the second light path control pattern 322 may not be limited, in some cases, the second light path control pattern 322 can be disposed in an area overlapping the first reflective layer 241, or can be disposed to overlap an area overlapping the first reflective layer 241 and a portion of the first hole H1 of the first reflective layer 241.

A portion of the first reflective layer 241 can overlap the light path control pattern 320.

The first reflective layer 241 can be disposed to be exposed not less than a certain distance from the outer boundary of the second light path control pattern 322 for light-guiding a light reflected by the second light path control pattern 322.

For example, a horizontal distance between the outer boundary of the second light path control pattern 322 and a boundary of the second reflective layer 242 can be equal to or greater than a value multiplying a vertical distance d2 between the first reflective layer 241 and the second light path control pattern 322 and a tangent function value of the critical angle $\Phi$.

As the second reflective layer 242 is located at least $d2 \times \tan \Phi$ or more apart from the outer boundary of the second light path control pattern 322, a light reflected on the second light path control pattern 322 can be reflected by the first reflective layer 241 to be light-guided.

The horizontal distance between the outer boundary of the second light path control pattern 322 and the boundary of the second reflective layer 242 can be equal to or greater than $d2 \times \tan \Phi$, in a case that a portion of the first reflective layer 241 overlaps the light path control pattern 320, a length M that the first reflective layer 241 is exposed can be greater than $d2 \times \tan \Phi$ and smaller than $r2/2 + d2 \times \tan \Phi$.

For example, an area where the second light path control pattern 322 is disposed and the length L of the second light path control pattern 322 can be determined by using the critical angle $\Phi$ that a light is totally reflected on the top surface of the light source protective portion 250. And considering an area where the light path control pattern 320 is disposed and a distance between the first reflective layer

241 and the light path control pattern 320 or the like, the length M that the first reflective layer 241 is exposed can be determined.

Besides examples described above, an area where the light path control pattern 320 and the reflective layer 240 are disposed can be various according to a size of the light source 230 or a thickness of the light source protective portion 250.

According to aspect of the present disclosure described above, by the light path control pattern 320 having different types of reflective characteristics and the reflective layer 240 having different types of reflective characteristics, a distance that the light emitted from the light source 230 is light-guided inside the light source protective portion 250 can be increased.

Thus, a distance between the light sources 230 can be increased, and the number of the light sources 230 included in the backlight unit can be reduced.

And as making the light supplied to each area evenly by the light path control pattern 320 and the reflective layer 240, an image quality of the backlight unit can be improved while maintaining a thin thickness of the backlight unit and reducing the number of the light source 230 included in the backlight unit.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure. Thus, the scope of the present disclosure is not limited to the aspects shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:
    a display panel; and
    a backlight unit supplying light to the display panel,
    wherein the backlight unit comprises;
    a plurality of light sources disposed on a substrate;
    a plurality of first light path control patterns located over the plurality of light sources, corresponding to each of the plurality of light sources, and among reflected light by the first light path control pattern, a ratio of specularly reflected light is smaller than a ratio of diffusely reflected light;
    a plurality of second light path control patterns located around each of the plurality of first light path control patterns, and among reflected light by the second light path control pattern, a ratio of specularly reflected light is greater than a ratio of diffusely reflected light;
    a first reflective layer disposed on at least a part of an area other than an area where the plurality of light sources are disposed on the substrate; and
    a second reflective layer disposed on a partial area on the first reflective layer.

2. The display device of claim 1, wherein a portion or a boundary of the second light path control pattern is located on a point making a critical angle that light emitted from the light source is totally reflected.

3. The display device of claim 1, wherein the second light path control pattern is located outside a point making a critical angle that light emitted from the light source is totally reflected.

4. The display device of claim 1, wherein an empty space is present between an outer edge of the first light path control pattern and an outer boundary of the second light path control pattern.

5. The display device of clam 1, wherein a portion of the second light path control pattern overlaps with a portion of the first reflective layer.

6. The display device of claim 1, wherein a horizontal distance between an outer boundary of the second light path control pattern and a boundary of the second reflective layer is equal to or greater than a value multiplying a vertical distance between the first reflective layer and the second light path control pattern and a tangent function value of a critical angle that a light emitted from the light source is totally reflected.

7. The display device of claim 1, wherein a ratio of specularly reflected light among reflected light by the first reflective layer is different from a ratio of specularly reflected light among reflected light by the second reflective layer.

8. The display device of claim 1, wherein among reflected light by the first reflective layer, a ratio of specularly reflected light is greater than a ratio of diffusely reflected light.

9. The display device of claim 1, wherein among reflected light by the second reflective layer, a ratio of specularly reflected light is smaller than a ratio of diffusely reflected light.

10. The display device of claim 1, wherein a boundary of the second reflective layer is located inside a boundary of the first reflective layer.

11. The display device of claim 1, wherein each of the first reflective layer and the second reflective layer comprises a plurality of holes corresponding to each of the plurality of light sources, and a size of the hole included in the second reflective layer is greater than a size of the hole included in the first reflective layer.

12. The display device of claim 1, wherein a thickness of the first reflective layer is smaller than a thickness of the second reflective layer.

13. A backlight unit, comprising:
    a plurality of light sources; and
    a plurality of light path control patterns located over the plurality of light sources, and corresponding to each of the plurality of light sources,
    wherein each of the plurality of light path control patterns comprises;
    a first part disposed on an area including an area overlapping the light source, and among a reflected light by the first part, a ratio of specularly reflected light is smaller than a ratio of diffusely reflected light; and
    a second part disposed around the first part, and among reflected light by the second part, a ratio of specularly reflected light is greater than a ratio of diffusely reflected light.

14. The backlight unit of claim 13, wherein an empty space is not present inside an outer edge of the first part, and an empty space is present between an inner boundary of the second part and an outer boundary of the second part.

15. The backlight unit of claim 13, wherein a thickness of the first part is greater than a thickness of the second part.

16. A backlight unit, comprising:
a plurality of light sources disposed on a substrate;
a plurality of light path control patterns located over the plurality of light sources, and corresponding to each of the plurality of light sources;
a first reflective layer disposed on at least a part of an area other than an area where the plurality of light sources are disposed on the substrate, and comprising a plurality of first holes corresponding to each of the plurality of light sources; and
a second reflective layer disposed on a partial area on the first reflective layer, comprising a plurality of second holes corresponding to each of the plurality of light sources, and a size of each of the plurality of second holes is greater than a size of each of the plurality of first holes.

17. The backlight unit of claim 16, wherein an outer edge of each of the plurality of light path control patterns is located between a boundary of each of the plurality of first hole and a boundary of each of the plurality of second hole.

18. The backlight unit of claim 16, wherein a top surface of the first reflective layer is located lower than a top end of the light source, and a top surface of the second reflective layer is located higher than the top end of the light source.

19. The backlight unit of claim 16, wherein among a reflected light by the first reflective layer, a ratio of specularly reflected light is greater than a ratio of diffusely reflected light, and among reflected light by the second reflective layer, a ratio of specularly reflected light is smaller than a ratio of diffusely reflected light.

* * * * *